United States Patent [19]

Hittie

[11] Patent Number: 4,695,092
[45] Date of Patent: Sep. 22, 1987

[54] PADDED INFANT SEAT LINER

[76] Inventor: Debra A. Hittie, R.D. #1, Friedens, Pa. 15541

[21] Appl. No.: 915,408

[22] Filed: Oct. 6, 1986

[51] Int. Cl.⁴ ............................................. A47C 7/02
[52] U.S. Cl. .................................. 297/230; 297/181; 297/250
[58] Field of Search ............... 297/250, 464, 181, 230; 446/72; 5/432, 433

[56] References Cited

U.S. PATENT DOCUMENTS

| | | | |
|---|---|---|---|
| 3,840,916 | 10/1974 | Jennings | 5/432 |
| 4,197,604 | 4/1980 | Nakamura | 446/72 |
| 4,316,287 | 2/1982 | Rule | 5/413 |
| 4,512,047 | 4/1985 | Johnson | 5/432 |
| 4,613,188 | 9/1986 | Tsuge et al. | 297/464 X |

FOREIGN PATENT DOCUMENTS 1494651 12/1977 United Kingdom ................ 297/250

*Primary Examiner*—James T. McCall
*Attorney, Agent, or Firm*—George C. Atwell

[57] ABSTRACT

A padded liner, primarily for use beneath an infant seated in a safety automobile seat, preferably in the form of a fanciful animal figure, comprises discretely-formed cushions joined by sewing at appropriate edges, thereby forming a substantially self-standing unit. The padded cushions or sections of the unit are shaped and adapted to provide comfort and support, to an infant seated thereagainst, in a manner not normally found in an unlined typical safety seat in a vehicle. Further, the shape of the sections enables conformity to an infant's growth pattern such that the liner contributes to the traveling comfort for the infant during the entire time period that the supporting safety seat is usable for the infant's transport. The liner has structural characteristics and features enabling it to be used to similar advantage in other forms of chairs or seats designed for use by small children.

7 Claims, 5 Drawing Figures

PADDED INFANT SEAT LINER

BACKGROUND OF THE INVENTION

This invention relates generally to a padded liner to be placed between an infant and a seat, primarily a safety seat in a vehicle in which an infant is seated and restrained for normal transport. The invention more particularly pertains to the shape and interconnection of parts of a child's seat liner whereby comfort and support of the child is greatly improved at any stage of development of the child when the child is age-compatible with the use of the supporting seat.

In recent years it has come to be recognized that transporting a child in a moving vehicle without restraint is extremely dangerous because of the inherent forces of acceleration when the moving vehicle suddenly slows or is abruptly stopped in a collision. Typical protective devices, such as lap or shoulder belts used by adults are unacceptable methods of restraint for infants in such circumstances because of the general lack of lateral body support and because no provision is made for cushioning or absorbing the energy of movement of the infant's head, which, particularly in the early years, has the greatest mass of any body part and is particularly susceptible to the forces of quick turns or rapid vehicle speed changes. Moreover, when traveling long distances, the discomfort of a small child is significantly increased when it is restrained on a car seat designed for the support and comfort of an adult.

Various manufacturers have introduced safety seats or chairs for infants and small children consistent with Federal safety standards. Although differing in exact configuration, such seats generally include a one-piece shell-like rigid molded seat secured to a frame formed from metal tubing sections. The frame is adaptively shaped to conform to the surface of the back and seat in an automobile whereby the typical adult lap belt may be utilized to secure the frame in the installed position. The entire assembly is usually adapted for selective reversal whereby a child seated therein can be disposed to face forward or backward in the automobile. It is the obvious intention that such assemblies be positioned to face rearwardly when used for a small infant to provide full spinal and head cushioning in the event of rapid slowing or abrupt stops of the automobile. For an older child, the assembly can be used in the forward-facing position, and a padded crossbar is normally provided which can be selectively placed in a position forward of the child to cushion the head if the child is thrown violently forward against the body-restraining belts included in the assembly.

While the chair or seat portion of such assemblies are often thinly lined or padded, the fact that the seat must be of appropriate size to receive, for example, a child of two years of age, creates a problem for the comfortable seating and support of a relatively young, small infant who occupies only a fraction of the total available seating area. It is customary for an attending adult to wedge small cushions or folded blankets on either side of the child to provide additional body and head support. A particularly difficult situation develops when an infant falls asleep in the seat while traveling and its head falls to either side without adequate cushioning or support while its body is held substantially erect against the seat back due to the fastened belt portions which hold the body in position.

SUMMARY OF THE INVENTION

This invention comprehends the provision of a padded liner for a child's chair or seat, in an aesthetically pleasing and inviting form which has definite utility value and characteristics not found in liners normally provided on safety car seats.

It is a primary objective of this invention to provide, for a child's safety car seat, a liner which can be the sole liner in the seat or, alternatively, can be used in combination with a liner already present.

A primary feature and objective of this invention is a liner of the type described, which specifically provides increased infant comfort and a high security factor, enabled by the shape and size of the liner, and the nature, thickness, and specific disposition of padding within side cushions constituting integral parts of the liner unit.

The structure of the liner of the present invention is specifically designed to accommodate, secure, and adapt to the growth pattern of a child from early infancy to its first few formative years, a concept which will be more easily appreciated from the ensuing detailed description when read in reference to the accompanying drawings.

DESCRIPTION OF A PREFERRED EMBODIMENT

Figure 1:
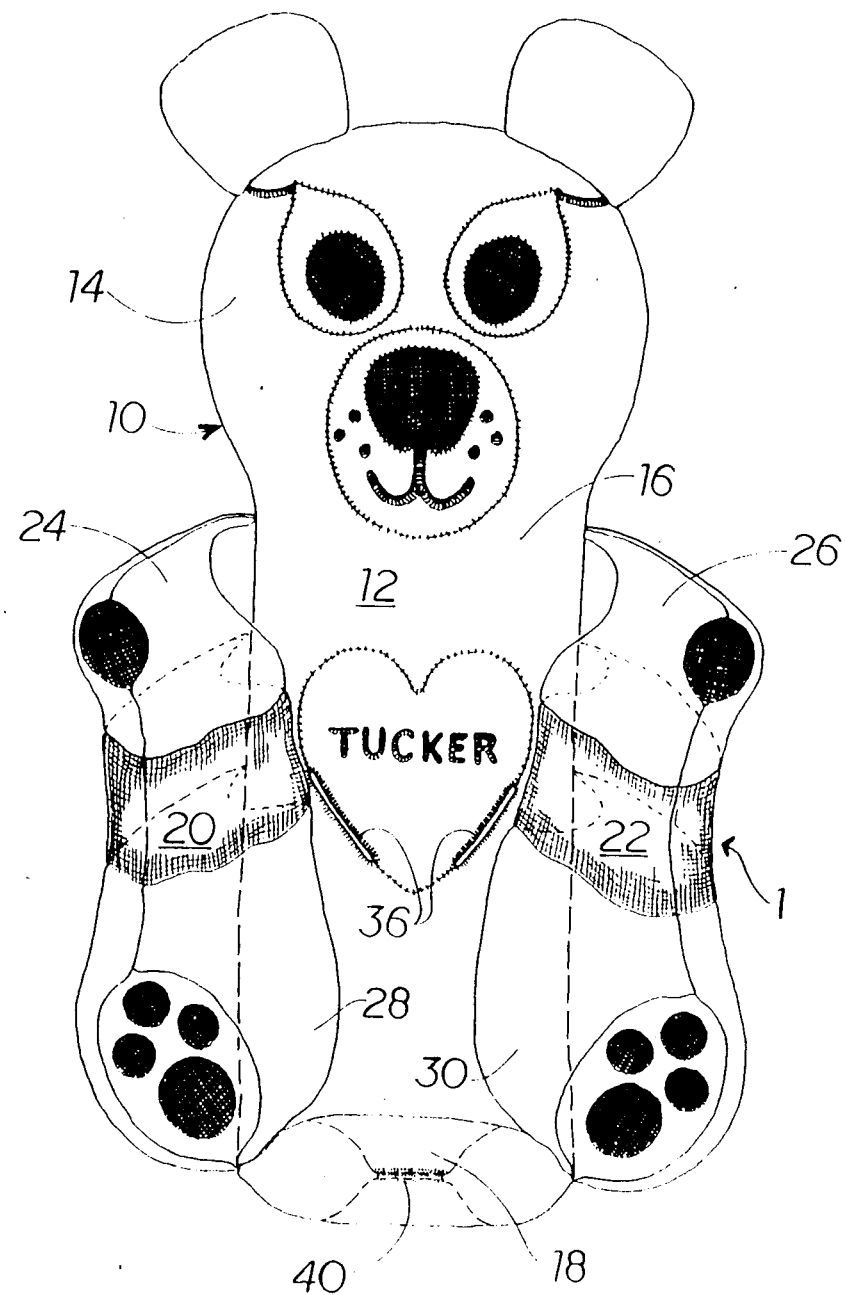
FIG. 1 is a front elevational view of the presently preferred embodiment of a child's safety seat liner in accordance with the present invention.
Figure 2:
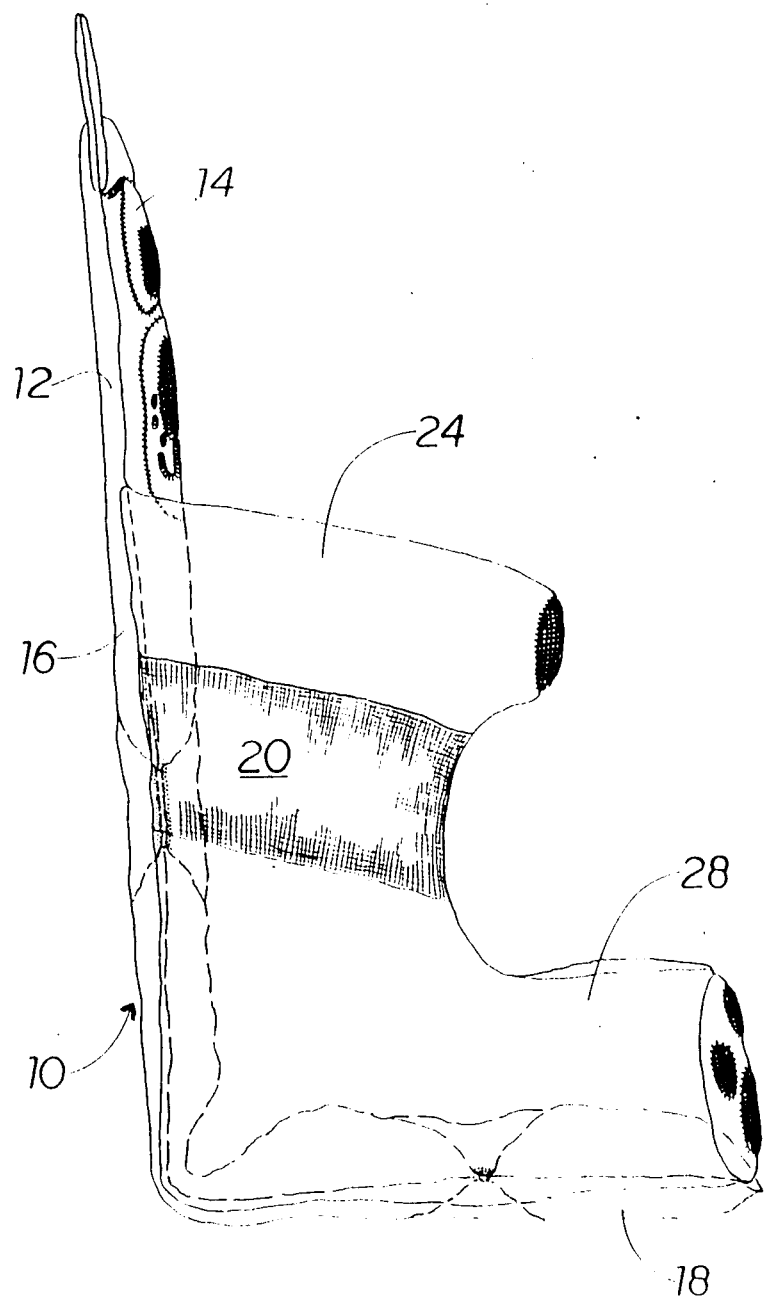
FIG. 2 is a side elevational view of the embodiment first shown in FIG. 1.
Figure 3:
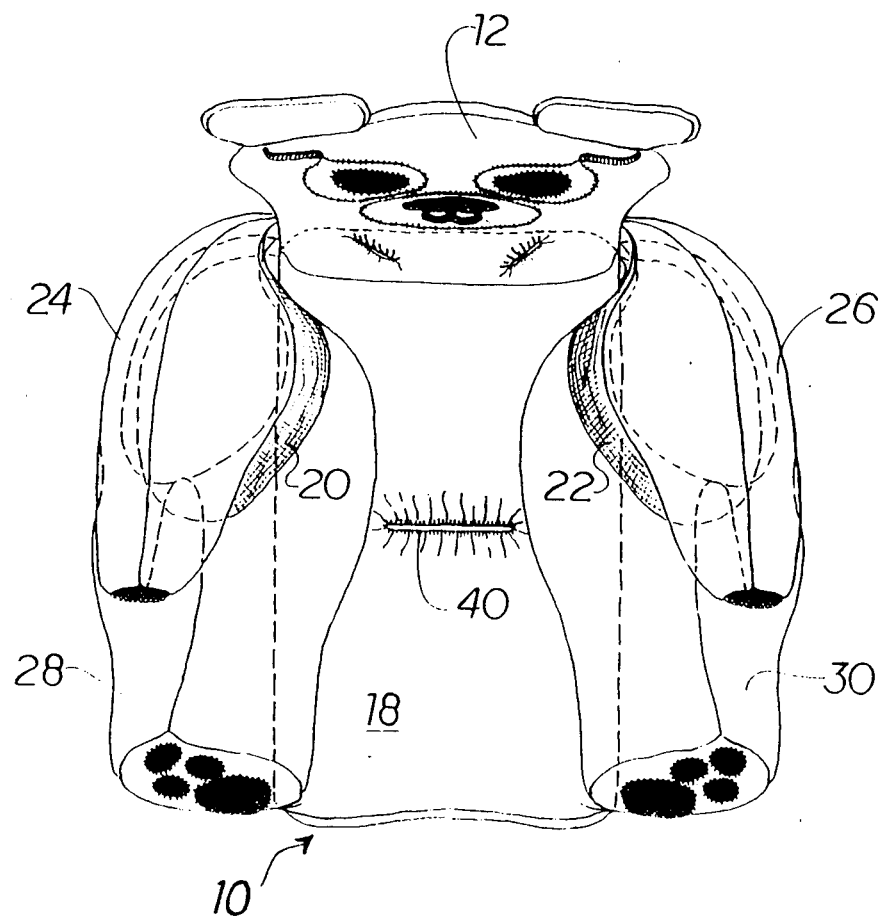
FIG. 3 is a top plan view of the invention embodiment first shown in FIG. 1.

A preferred embodiment of the present invention is shown in FIG. 1, which illustrates a child's automobile safety seat liner 10 comprising a major first cushion or backing portion 12 having an upper portion 14 and a lower portion 16. A second cushion 18 is joined by sewing along its rear edge to the lower edge of the first cushion 12. Joined to the side edges of the first cushion 12 are side cushions 20 and 22 having upper respective portions 24 and 26 and substantially wider respective lower portions 28 and 30.

The liner 10 is a substantially self-supporting or free-standing unit preferably designed as a fanciful figure, here simulating a bear wherein the first cushion upper end or portion 14 is the bear's head and the lower portion 16 of the cushion 12 is the torso or body of the bear. The side cushions 20 and 22 are designed to visually suggest the bear's forward and rear legs, although for descriptive purposes, portions 24 and 26 are hereinafter referred to as arms as opposed to leg portions 28 and 30.

Although comfortably padded, the cushion 10 and 18, which serve as the back and feet of the liner, respectively, are substantially flat as compared to the spaced-apart oppositely-disposed side cushions 20 and 22. Each of the side cushions 20 and 22 is heavily padded at the lower ends thereof to provide a substantially wide cushioned area which serves as a supportive base for the somewhat thinner but firmly padded upper cushion ends 24 and 26.

Figure 4:
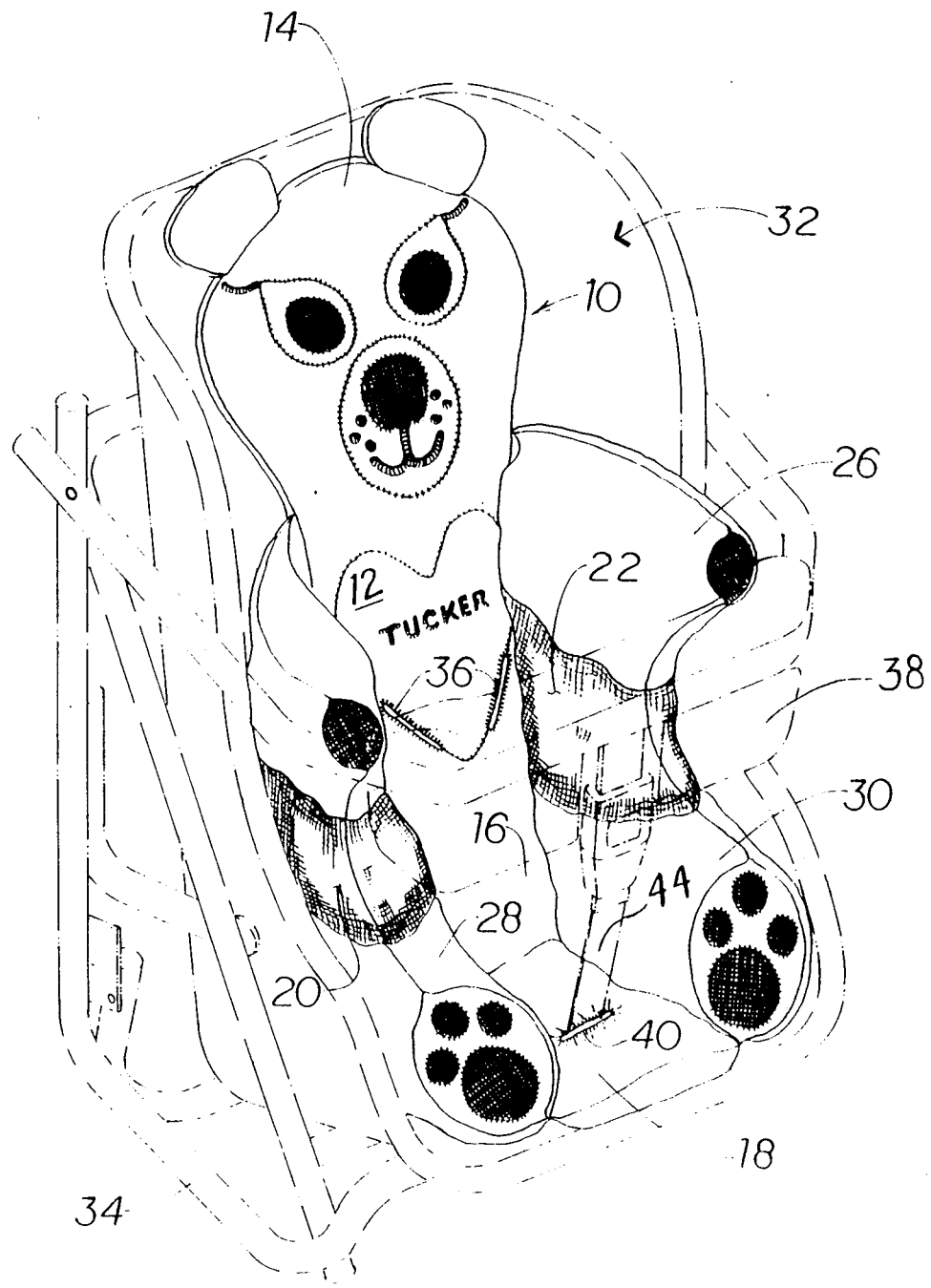
FIG. 4 is a perspective view of the invention embodiment first shown in FIG. 1, on a relatively smaller scale, and shown in the position of its intended use in one form of a child's automobile safety seat.
Figure 5:
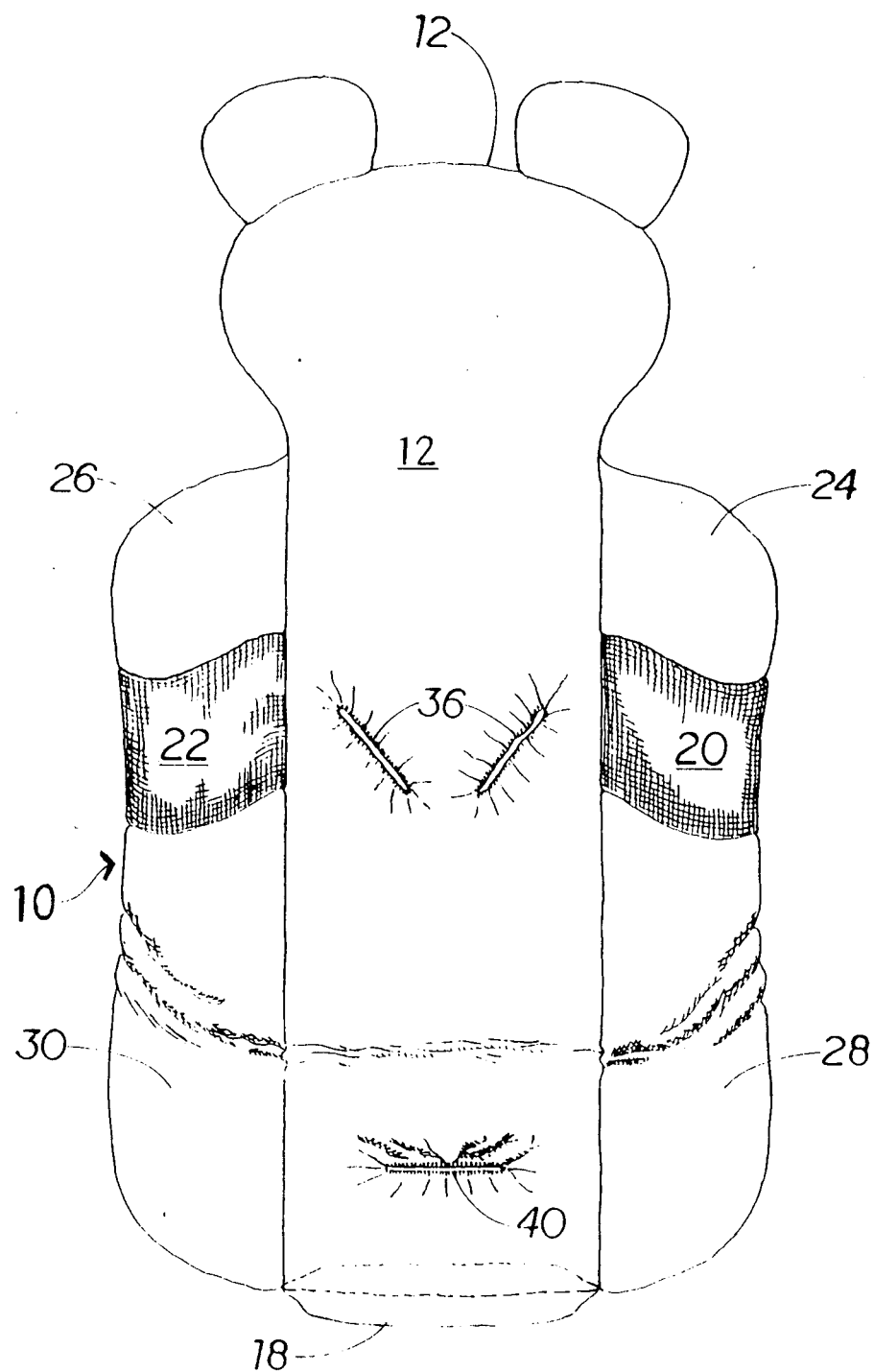
FIG. 5 is a rear elevational view of the embodiment first shown in FIG. 1.

The liner 10 is intended for use in an infant's safety automobile seat of the type comprising a molded shell or rigid seat structure such as seat 32 shown in FIG. 4. FIG. 4 also illustrates a metallic tubular structure 34 to which the seat 32 would normally be secured. The seat 32 and support structure 34 are representative of typical safety car seats available for transporting a small child in an automobile. Such assemblies are designed to be secured in position in an automobile by firm attachment on the automobile's seat with the lap safety belt normally provided for adult use. The lap belt is threaded through the tubular structure and fastened beneath the seat 32 to hold the assembly in position.

The structure 34 includes a well-padded cross member 38 which is pivotally mounted to be swung between the position shown in FIG. 4 and a retracted position (not shown) which enables an infant to be placed in a seated position against the liner 10. An auxiliary belt 44, fastened at its lower end beneath the cushion 18 to a crossbar of the structure 34, is utilized to lock the cross member 38 in the position shown in FIG. 4.

A child placed in the car seat 32, with the liner 10 in the position shown, will obviously face forwardly whereby its legs extend forwardly on either side of the belt 44. A comparatively small infant will occupy only the lower portion of the liner 10, its legs will rest substantially fully on the surface of the cushion 18, and its shoulders may be below the level of the cross member 38. For such use, the heavily padded lower portions 28 and 30 of the side cushions 20 and 22 are intended to center the child's hips and cushion it against side shifting. The upper portions 24 and 26 of the side cushions 20 and 22 then serve as resilient bumpers or cushions to support the lolling head of a sleeping infant as hereafter further described. A larger child, as for example a child more than one year old but less than two, will normally have sufficient torso height whereby its shoulders will be generally on the level of the upper cushion portions 24 and 26 whereby these portions may be utilized as arm rests.

The liner 10 is structured to resiliently conform to the seated body of an infant or child placed thereon, with the portions 28 and 30 giving additional cushioning and resilient support to the lower body and upper legs of the child. Both the cushion 18 and the cushion 12 are appropriately slotted to enable extension therethrough of the webbing or belt portions which normally are provided and secured to the seat 32 and intended to wrap downwardly over the shoulders and upwardly between the legs of the infant. Additional slots (not shown) can be provided in vertical-spaced relation in the first backing cushion 12 to enable the belt portions to be drawn through the liner at the most appropriate height consistent with the child's size. For illustrative purposes, the liner 10 is shown as having slots 36 and 40 for the purpose heretofore described.

A specific feature of the liner 10, in accordance with the present invention, is the provision of the side cushions 20 and 22 in the particular configuration and dimensions shown. Because of the relatively heavy padding provided in the lower end portions 28 and 30, placement of the child's body therebetween has the effect of compressing the side cushions between the child's body and the sides of the seat 32 (see FIG. 4), forcing the padding to displace upwardly and give added rigidity to the portions 24 and 26. The portions 24 and 26 will, in turn, serve as side support for the tilted head of a small sleeping infant or, in a case of a larger child, as firm support on which the child's arms can be rested.

The relatively wide expanse of the side cushions 20 and 22 at their lower end and their lower, upwardly-narrowing configuration has the additional effect, when the liner is in use by a larger child, of causing the arm portions 24 and 26 to "tuck" or wrap around the child's body, thus providing additional warmth, comfort, and security.

Obviously, the appearance design of the liner 10 can be modified or changed to represent any fanciful figure which is attractive and inviting. The preferred embodiment of the liner 10 shown in the drawings is a representation of the familiar "teddy bear". Because of the "tucking" feature heretofore described which is inherent in the liner structure, it is presently intended, for marketing purposes, that the liner be provided the trade name of "Teddy Tucker" or, simply "Tucker".

The liner 10 disclosed herein and illustrated in the accompanying drawings may be selectively used as a seat pad in any child's seat or chair. As with the car seat structure illustrated in FIG. 4, the "tucking" and body supporting characteristics heretofore described are also obtained when the liner is used for placing a child in the typical high chair having a forwardly-positioned eating tray extending across placed-apart side arms, or in a small infant swing adapted for chain suspension and having a safety crossbar.

A further feature of the liner 10 which should not be ignored is its inherent insulative qualities. It not only prevents contact between the child's body and a vinyl shell-type car seat or the metal seat surface of a stroller, but the substantial fill in its cushions serves to reduce rapid body heat loss, thus increasing the warmth and security of the child.

The method of constructing the liner 10 comprises certain basic steps. The backing cushion 12, the second or seat cushion 18, and the side cushions 20 and 22, which are mirror images of each other, are separately constructed by sewing of appropriate cloth panels. Each cushion is stuffed with the desired amount of cushioning fill prior to closing the final edge seam and then the separate cushions are joined to form the configuration shown in FIG. 1. More specifically, interfacing and batting are sewn to the back cushions, particularly along the back longitudinal edge, whereupon the side cushions are thereby joined to the side edges of the back cushion 12. The second or bottom cushion is thereafter sewn into position, three of its edges being joined to the bottom of the first cushion 12 and the respective side cushions 20 and 22.

The thickness and density of the cushioning fill within each of the cushions forming the liner 10 is strategically placed to obtain the desired final form of the unit. While a uniform, comparatively thin layer of cushioning fill is provided in the back cushion 14 and the bottom cushion 18, the respective side cushions 20 and 22 are purposely shaped to accept a substantially greater thickness and density, both as compared to the back and bottom cushions and within successive vertical levels in the side cushions. The lower or leg portions 28 and 30 of the cushions 20 and 22 are densely filled to have a thickness greater than any other part of the liner 10, and each of these portions is thicker in cross section relative to the vertically successive intermediate areas of the side cushions. The upper ends or arms 24 and 26 of the side cushions 20 and 22 are preferably equal to or thinner in cross-thickness to the respective subjacent intermediate portions and considerably thinner than the leg portions 28 and 30.

The eyes, mouth, and nose, as well as the "paw pads" which contribute to the visual representation established on the exterior of the liner may be applied by embroidery or applique or any suitable means to create a colorful, attractive and inviting image as shown in or significantly different from the illustrated preferred embodiment. Obviously, contrasting materials and panel colors can be selectively employed to further enhance the appearance.

In view of the foregoing description of one form of the present invention and a method for its construction, it should be appreciated that the disclosed concept is adaptable to extensive variation or modification. The specific structure of the padded liner and the method of its construction herein described is not intended to limit, in any way, the scope of the invention. It is contemplated that the invention herein may be variously adapted by those skilled in the art, in light of the above teachings, without departing from the spirit and scope of the invention as defined in the appended claims.

I claim:

1. A padded liner, for use in an infant safety automobile seat of the type having a shell-like chair with a high-back portion, attached to a support frame and adapted to be fastened in use position by the automobile lap belt retainably strapped to the frame, comprising:

a plurality of cushions sewn together to form a substantially self-supporting unit, including a vertically-elongated first backing cushion, a comparatively small and generally rectilinear second cushion having a rearward edge sewn to the lower edge of the first cushion, a pair of vertically-extending spaced-apart side cushions each having a rearward edge joined to a vertically-oriented edge of the first backing cushion;

each of the side cushions having a cross-sectional thickness substantially greater than the thickness of the first and second cushions, and the upper edge of the side cushions being on a level above the horizontal midline of the first backing cushion;

the thickness of the padding in each side cushion adjacent its jointure to the second cushion being substantially greater than the padding thickness at its upper end and of such thickness that placing a child, of sufficient size to fully cover the second cushion, in seated position on the second cushion will cause the padding in the lower ends of the side cushions to compressibly upwardly displace; and the liner being in the form of a fanciful figure wherein the first cushion constitutes a torso and head, and each side cushion constitutes an arm and leg portion of the figure.

2. The liner of claim 1 having slots provided through the first backing cushion to permit extension therethrough a safety harness belt portion.

3. The liner of claim 2 wherein the second cushion has at least one slot to permit extension therethrough of a safety harness belt portion.

4. The liner of claim 1 wherein the greatest vertical dimension of the first cushion is in the range of 18–24 inches.

5. The liner of claim 1 wherein the greatest vertical dimension of the side cushions is in the range of 9–13 inches.

6. The liner of claim 1 wherein the uncompressed padding thickness of the first backing cushion and second cushion is substantially the same, and the uncompressed thickness of each of the side cushions is at least three times greater than the uncompressed thickness of the first backing cushion or the second cushion.

7. A method of constructing an infant's seat liner comprising the steps of:

(1) forming an elongated back cushion with a generally uniform interior cushion fill;

(2) forming a generally rectilinear bottom cushion with cushioning fill of substantially the same thickness as the back cushion;

(3) forming a pair of side cushions each with substantially greater cushioning fill than the back and bottom cushions, distributing the fill thickly at one end of each side cushion and reducing it to a lesser thickness at its other end;

(4) joining the cushions by selected edges to form the liner so that the thickest part of each side cushion is adjacent the bottom cushion.

* * * * *